United States Patent
Keum et al.

(10) Patent No.: US 9,854,298 B2
(45) Date of Patent: Dec. 26, 2017

(54) APPARATUS AND METHOD FOR PROVIDING N-SCREEN SERVICE IN BROADCAST SYSTEM

(71) Applicant: Samsung Electronics Co. Ltd., Suwon-si, Gyeonggi-do (KR)

(72) Inventors: Ji-Eun Keum, Suwon-si (KR); Young-Sun Ryu, Seongnam-si (KR); Jae-Yeon Song, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/954,290

(22) Filed: Jul. 30, 2013

(65) Prior Publication Data
US 2014/0040963 A1  Feb. 6, 2014

(30) Foreign Application Priority Data
Jul. 31, 2012 (KR) ........................ 10-2012-0083750

(51) Int. Cl.
| | | |
|---|---|---|
| *H04N 7/18* | (2006.01) | |
| *H04N 21/436* | (2011.01) | |
| *H04N 21/41* | (2011.01) | |
| *H04N 21/81* | (2011.01) | |

(52) U.S. Cl.
CPC ... *H04N 21/43615* (2013.01); *H04N 21/4126* (2013.01); *H04N 21/8186* (2013.01)

(58) Field of Classification Search
CPC .......................... H04N 7/106; H04N 21/43615
USPC ................. 725/25, 76, 78, 93, 110, 151, 105
See application file for complete search history.

(56) References Cited

U.S. PATENT DOCUMENTS

| | | |
|---|---|---|
| 2005/0160471 A1 | 7/2005 | Cohen |
| 2005/0251823 A1 | 11/2005 | Saarikivi |
| 2008/0077965 A1* | 3/2008 | Kamimaki ............. H04N 7/163 725/105 |
| 2009/0049092 A1 | 2/2009 | Capio et al. |

(Continued)

FOREIGN PATENT DOCUMENTS

| | | |
|---|---|---|
| EP | 2 343 881 A2 | 7/2011 |
| JP | 2010-537514 A | 12/2010 |

(Continued)

OTHER PUBLICATIONS

XP014045075, "Digital Video Broadcasting (DVB); Signalling and carriage of interactive applications and services in Hybrid broadcast/broadband environments", Jan. 1, 2010.

(Continued)

*Primary Examiner* — Jivka Rabovianski
(74) *Attorney, Agent, or Firm* — Jefferson IP Law, LLP (57) ABSTRACT

A method for supplying an N-screen service by a main N-screen device in a broadcast system is provided. The method includes receiving an Application Information Table (AIT) including a screen_type indicating a type of N-screen device in which a broadcast service application will be run from a broadcast service provider, and one of running the broadcast service application based on the screen_type, performing an operation related to running the broadcast service application by considering a connection relationship between the main N-screen device and a sub N-screen device based on the screen_type, and discarding the AIT based on the screen_type.

6 Claims, 7 Drawing Sheets

(56) References Cited

U.S. PATENT DOCUMENTS

| | | |
|---|---|---|
| 2010/0046842 A1 | 2/2010 | Conwell |
| 2010/0222102 A1 | 9/2010 | Rodriguez |
| 2011/0138416 A1* | 6/2011 | Kang .................... G06F 3/0482 725/39 |
| 2011/0170013 A1 | 7/2011 | Todoroki et al. |
| 2012/0089977 A1 | 4/2012 | Park et al. |
| 2013/0047183 A1 | 2/2013 | Chae |
| 2013/0155326 A1 | 6/2013 | Todoroki |
| 2013/0289983 A1* | 10/2013 | Park et al. .................... 704/235 |

FOREIGN PATENT DOCUMENTS

| | | |
|---|---|---|
| KR | 10-2005-0028356 A | 3/2005 |
| KR | 10-2010-0056933 A | 5/2010 |
| KR | 10-2011-0081537 A | 7/2011 |
| KR | 10-2012-0036021 A | 4/2012 |
| WO | 2012/053039 A1 | 4/2012 |

OTHER PUBLICATIONS

XP032153178, "Classification of N-Screen Services and its standardization", ICACT 2012 14th International Conference on, p. 597-602, Feb. 19, 2012.

\* cited by examiner

APPARATUS AND METHOD FOR PROVIDING N-SCREEN SERVICE IN BROADCAST SYSTEM

CROSS-REFERENCE TO RELATED APPLICATION(S)

This application claims the benefit under 35 U.S.C. §119 (a) of a Korean patent application filed on Jul. 31, 2012 in the Korean Intellectual Property Office and assigned Serial No. 10-2012-0083750, the entire disclosure of which is hereby incorporated by reference.

TECHNICAL FIELD

The present disclosure relates to an apparatus and method for providing an N-screen service in a broadcast system. More particularly, the present disclosure relates to an apparatus and method for providing an N-screen service by considering broadcast service applications which are run on a plurality of screens in a broadcast system.

BACKGROUND

Recently, a broadcast system has evolved to provide various functions like a Hybrid Broadcast Broadband TeleVision (HbbTV) which may support a broadcast channel, a broadband channel, and an Internet Protocol (IP) channel and a smart TeleVision (TV) and has provided various broadcast service applications.

Meanwhile, a mobile telephone has evolved to provide useful functions to a user through applications which provide various functions since the mobile telephone has evolved into a smart phone, so a usage of a portable terminal is generalized. Recently, users use portable devices such as a tablet and a laptop Personal Computer (PC) with the mobile telephone like the smart phone, and use the portable devices with a TV.

Recently, users may use contents using various electronic devices, so services which may use various electronic devices have been variously provided, and a typical example is an N-screen service. The N-screen service is a service in which at least two electronic devices may share contents or use the contents by interacting with one another, and use contents which has been used in only one electronic device by interacting with one another.

So, in an HbbTV system, there is a need for providing various User eXperiences (UXs) to a user by providing various broadcast service applications using an N-screen service.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for providing an N-screen service in a broadcast system.

Another aspect of the present disclosure is to propose an apparatus and method for providing an N-screen service by considering priorities of broadcast service applications which are run on a plurality of screens in a broadcast system.

Another aspect of the present disclosure is to propose an apparatus and method for providing an N-screen service by considering relationships of broadcast service applications which are run on a plurality of screens in a broadcast system.

Another aspect of the present disclosure is to propose an apparatus and method for providing an N-screen service by considering positions of a plurality of screens in a broadcast system.

In accordance with an aspect of the present disclosure, a main N-screen device in a broadcast system is provided. The main N-screen device includes a broadcast processor configured to receive an Application Information Table (AIT) including a screen_type indicating a type of N-screen device in which a broadcast service application will be run from a broadcast service provider, and a controller configured to one of run the broadcast service application based on the screen_type, perform an operation related to running the broadcast service application by considering a connection relationship between the main N-screen device and a sub N-screen device based on the screen_type, and discard the AIT based on the screen_type.

In accordance with another aspect of the present disclosure, a sub N-screen device in a broadcast system is provided. The sub N-screen device includes a broadcast processor configured to receive an AIT including a screen_type indicating a type of N-screen device in which a broadcast service application will be run from a main N-screen device, and a controller configured to run the broadcast service application based on the screen_type.

In accordance with another aspect of the present disclosure, an N-screen device in a broadcast system is provided. The N-screen device includes a broadcast processor configured to receive an AIT including an application bound indicating a broadcast service application IDentifier (ID) of an associated broadcast service application which is run by interacting with a broadcast service application from a broadcast service provider, and a controller configured to run the broadcast service application based on the application bound.

In accordance with another aspect of the present disclosure, a method for providing an N-screen service by a main N-screen device in a broadcast system is provided. The method includes receiving an AIT including a screen_type indicating a type of N-screen device in which a broadcast service application will be run from a broadcast service provider, and one of running the broadcast service application based on the screen_type, performing an operation related to running the broadcast service application by considering a connection relationship between the main N-screen device and a sub N-screen device based on the screen_type, and discarding the AIT based on the screen_ type.

In accordance with another aspect of the present disclosure, a method for providing an N-screen service by a sub N-screen device in a broadcast system is provided. The method includes receiving an AIT including a screen_type indicating a type of N-screen device in which a broadcast service application will be run from a main N-screen device, and running the broadcast service application based on the screen_type.

In accordance with another aspect of the present disclosure, a method for providing an N-screen service by an N-screen device in a broadcast system is provided. The method includes receiving an AIT including an application bound indicating a broadcast service application ID of an associated broadcast service application which is run by interacting with a broadcast service application from a broadcast service provider, and running the broadcast service application based on the application bound.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although ordinal numbers such as "first", "second", and so forth will be used to describe various components, those components are not limited by the terms. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

The terminology used herein is for the purpose of describing embodiments only and is not intended to be limiting of the embodiments. As used herein, the singular forms are intended to include the plural forms as well, unless the context clearly indicates otherwise. It will be further understood that the terms "comprises" and/or "has" when used in this specification, specify the presence of stated feature, number, step, operation, component, element, or a combination thereof but do not preclude the presence or addition of one or more other features, numbers, steps, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology. As long as the terms are not defined obviously, they are not ideally or excessively analyzed as formal meanings.

An aspect of the present disclosure is to propose an apparatus and method for providing an N-screen service in a broadcast system.

Another aspect of the present disclosure is to propose an apparatus and method for providing an N-screen service by considering priorities of broadcast service applications which are run on a plurality of screens in a broadcast system.

Another aspect of the present disclosure is to propose an apparatus and method for providing an N-screen service by considering relationships of broadcast service applications which are run on a plurality of screens in a broadcast system.

Another aspect of the present disclosure is to propose an apparatus and method for providing an N-screen service by considering positions of a plurality of screens in a broadcast system.

In the present disclosure, it will be assumed that the broadcast system is a Hybrid Broadcast Broadband TeleVision (HbbTV) system. An apparatus and method proposed in the present disclosure may be applied to other broadcast systems and communication systems, to which an N-screen service may be applied, such as a Moving Picture Experts Group (MPEG) Media Transport (MMT) system, an Evolved Packet System (EPS), a Long-Term Evolution (LTE) mobile communication system, a Long-Term Evolution-Advanced (LTE-A) mobile communication system, and an Institute of Electrical and Electronics Engineers (IEEE) 802.16m communication system.

For example, in various embodiments of the present disclosure, an N-screen device may be one of a portable terminal, a mobile terminal, a communication terminal, a portable communication terminal, a portable mobile terminal, etc.

For example, in various embodiments of the present disclosure, an N-screen device may be one of a smart phone, a cellular phone, a game console, a Television (TV), a display, a vehicle head unit, a notebook computer, a laptop computer, a tablet computer, a Personal Media Player (PMP), a Personal Digital Assistant (PDA), etc.

In various embodiments of the present disclosure, the N-screen device may be implemented with a pocket-size portable communication terminal having a wireless communication function.

In various embodiments of the present disclosure, the N-screen device may be a flexible device or a flexible display device.

Figure 1:
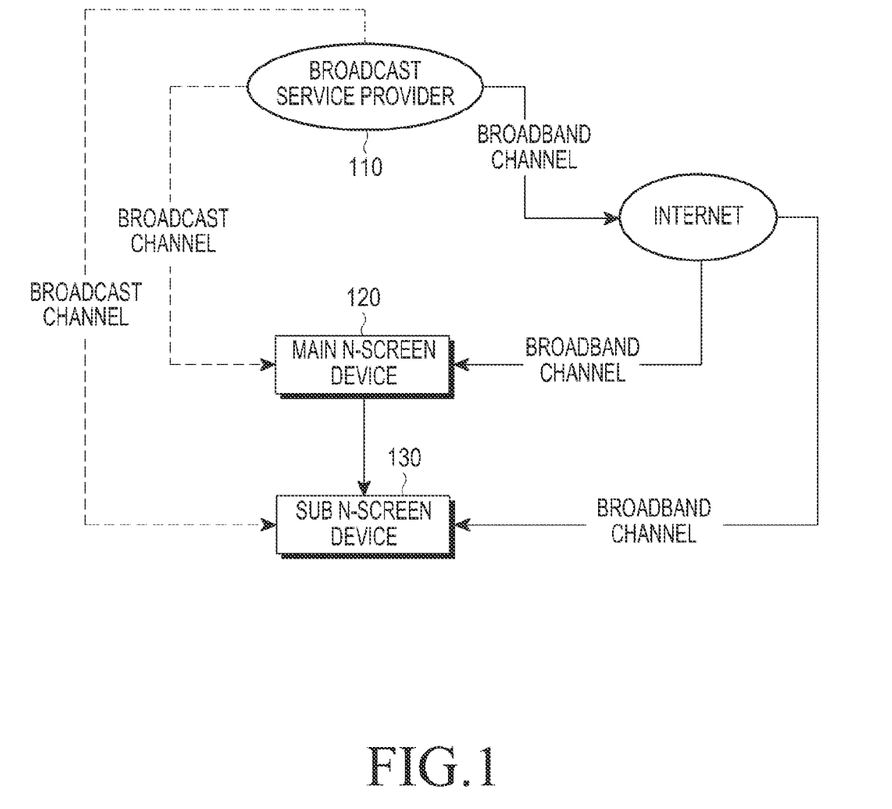
FIG. 1 schematically illustrates a structure of a Hybrid Broadcast Broadband TeleVision (HbbTV) system according to an embodiment of the present disclosure.

FIG. 1 schematically illustrates a structure of an HbbTV system according to an embodiment of the present disclosure.

Referring to FIG. 1, the HbbTV system includes a broadcast service provider 110, a main N-screen device 120, and a sub N-screen device 130. In FIG. 1, one main N-screen device is connected to one sub N-screen device. However, it will be understood by those of ordinary skill in the art that the number of sub N-screen devices which are connected to one main N-screen device is not limited.

The broadcast service provider 110 provides a broadcast service, and provides an Application Information Table (AIT) and meta data in order for each of the main N-screen device 120 and the sub N-screen device 130 to run an application related to the broadcast service, i.e., a broadcast service application. For example, the broadcast service provider 110 may be a broadcasting station. The broadcast service provider 110 provides broadcast service contents to be used in the broadcast service application through at least one of a broadcast channel and a broadband channel.

The main N-screen device 120 receives the AIT and the meta data from the broadcast service provider 110. The main N-screen device 120 transmits a broadcast service application run request message which requests to run a broadcast service application using the AIT to the broadcast service provider 110, and receives broadcast service application data through at least one of the broadcast channel and the broadband channel from the broadcast service provider 110 corresponding to the broadcast service application run request message.

The main N-screen device 120 runs the broadcast service application using the broadcast service application data received from the broadcast service provider 110. The main N-screen device 120 may communicate with the broadcast service provider 110 through at least one of the broadcast channel and the broadband channel while the main N-screen device 120 runs. For example, the main N-screen device 120 may be a TV. For example, in the present disclosure, it will be assumed that a size of a display included in the main N-screen device 120 is greater than a size of a display included in the sub N-screen device 130. Here, a relationship between the size of the display included in the main N-screen device 120 and the size of the display included in the sub N-screen device 130 is only for explanation.

The sub N-screen device 130 may be a hybrid terminal which may receive the broadcast channel and the broadband channel which are provided by the broadcast service provider 110, or a general terminal which may only be connected to a general interne network.

The broadcast service provider 110 transmits the AIT to the main N-screen device 120, and a format of the AIT is expressed in Table 1.

TABLE 1

| | |
|---|---|
| application_type | As required, e.g., Flash or HyperText Markup Language (HTML) |
| organisation_id | As defined by the application provider |
| application_id | As defined by the application provider |
| application_control_code | Not used |
| screen_type | Main/Sub_Alternative/Sub |
| application_descriptor( ) | |
| application_profile_length | 0 (no application profile provided) |
| service_bound_flag | Set as required |
| visibility | Not used |
| application_priority | Set as required |
| transport_protocol_label | At least one |
| transport_protocol_descriptor( ) | |
| protocol_id | 0x0001(Object Carousel) |
| selector_bytes | Carry the minimum application version |
| simple_application_location_descriptor( ) | |
| initial_path_bytes | Parameters for the application |

A description of the parameters in Table 1 is provided below.

(1) An application_type denotes a type of a required broadcast service application, and may be Flash or HTML.

(2) An organisation_id is defined by a broadcast service application provider which provides a broadcast service application, and denotes an IDentifier (ID) of the broadcast service application provider.

(3) An application_id is defined by a broadcast service application provider which provides a broadcast service application, and denotes an ID of a broadcast service application.

(4) A screen_type denotes a type of an N-screen device on which a broadcast service application will be run, may be one of "Main", "Sub_Alternative", and "Sub", and is expressed in Table 2.

TABLE 2

| | |
|---|---|
| Main | a broadcast service application which is run on a main N-screen device |
| Sub_Alternative | a broadcast service application which is preferentially run on a sub N-screen device, a broadcast service application which is run on a main N-screen device if there is no sub N-screen device |
| Sub | a broadcast service application which is not run if there is no sub N-screen device |

In Table 2, "Main" indicates that a related broadcast service application is a broadcast service application which is run on a main N-screen device, and "Sub_Alternative" indicates that a related broadcast service application is a broadcast service application which is preferentially run on a sub N-screen device and is run on the main N-screen device if there is no sub N-screen device. In Table 2, "Sub" indicates that a related broadcast service application is a broadcast service application which is not run if there is no sub N-screen device.

Figure 2A:
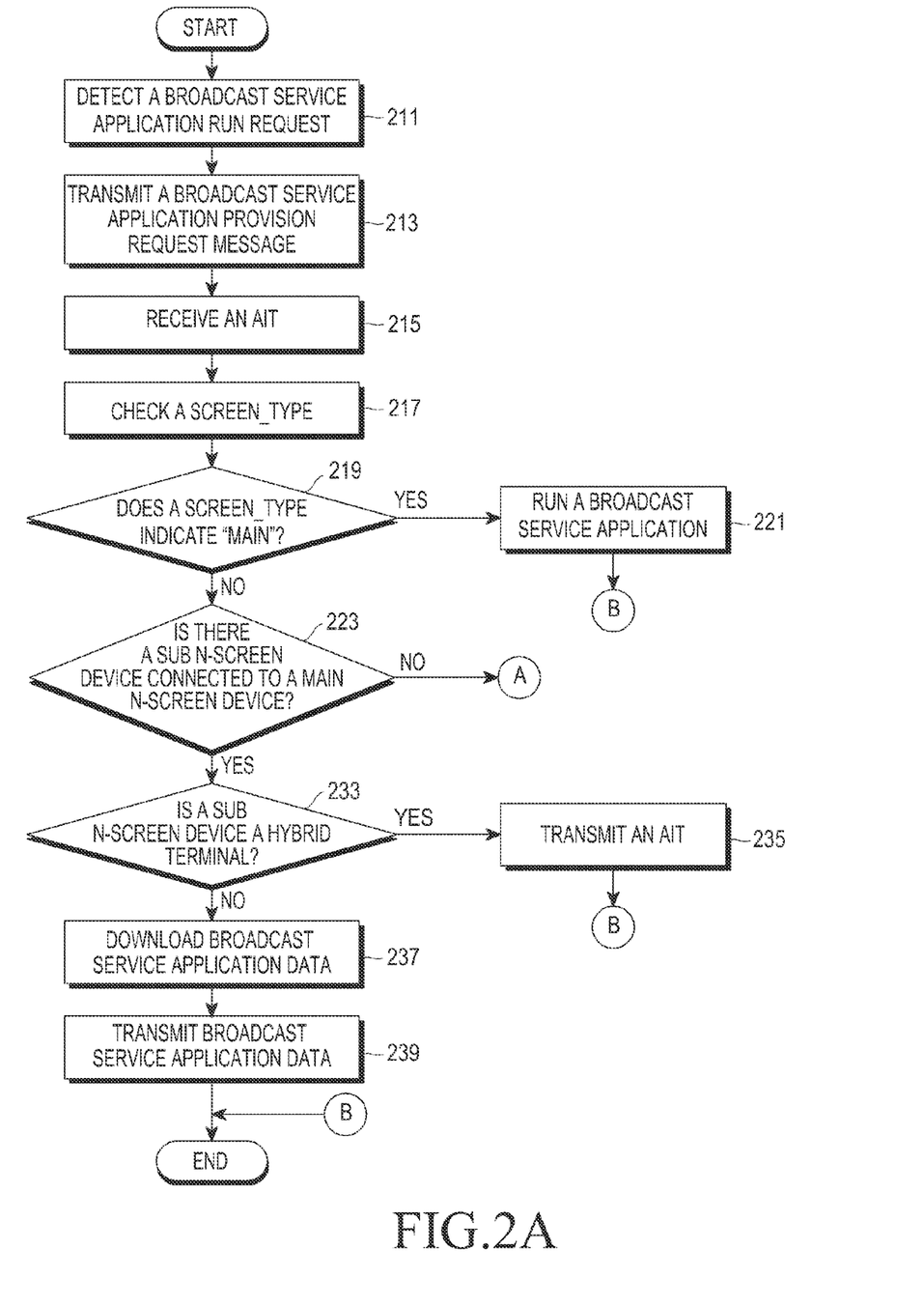
FIGS. 2A to 2B schematically illustrate a processor for providing an N-screen service in a main N-screen device in an HbbTV system according to an embodiment of the present disclosure.
Figure 2B:
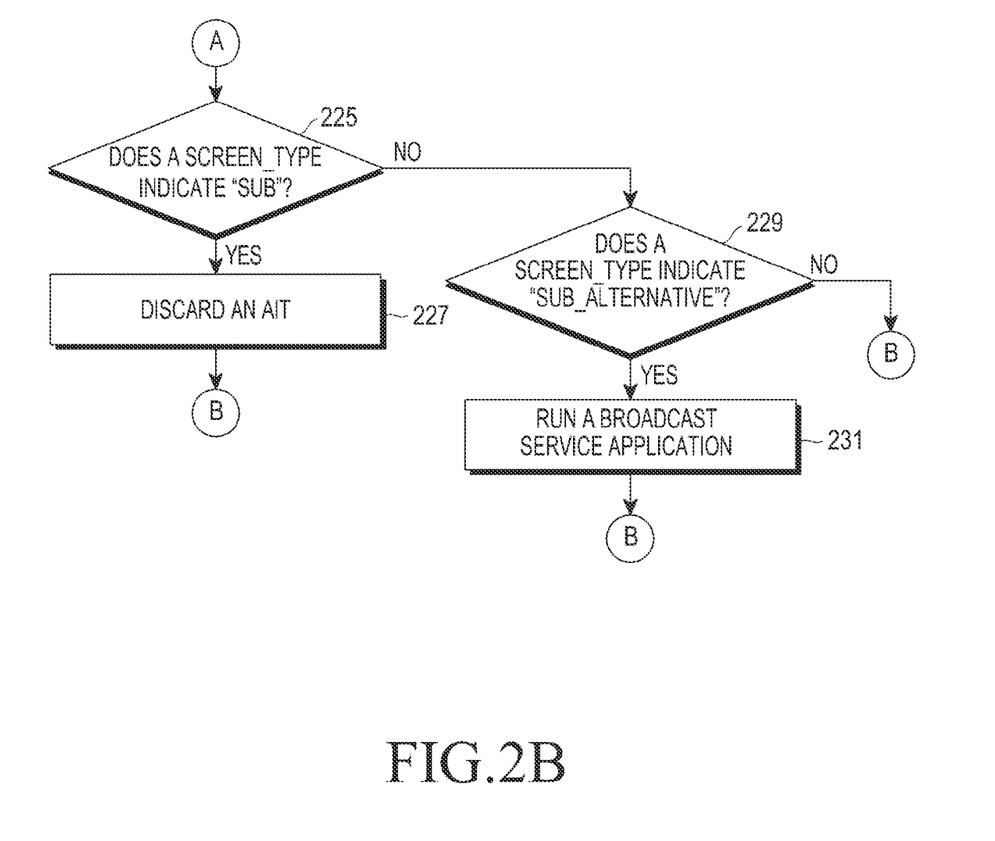

FIGS. 2A to 2B schematically illustrate a processor for providing an N-screen service in a main N-screen device in an HbbTV system according to an embodiment of the present disclosure.

Referring to FIGS. 2A to 2B, the main N-screen device detects a broadcast service application run request at operation 211. The broadcast service application run request may be detected from an input unit in the main N-screen device, or in a case that a broadcast service application run request message is received from a sub N-screen device. The main N-screen device transmits a broadcast service application provision request message to a broadcast service provider corresponding to the broadcast service application run request at operation 213. The main N-screen device receives an AIT from the broadcast service provider corresponding to the broadcast service application provision request message at operation 215. The main N-screen device checks a screen_ type of the received AIT at operation 217. The main N-screen device determines whether the screen_type indicates "Main" at operation 219. If the screen_type indicates "Main", the main N-screen device runs the broadcast service application at operation 221.

If the screen_type does not indicate "Main", the main N-screen device determines whether there is a sub N-screen device which is connected to the main N-screen device at operation 223. If the broadcast service application run request is detected in a case that the broadcast service application run request message is received from the sub N-screen device, operation 223 may be omitted. The reason is why the sub N-screen device is connected to the main N-screen device. If there is no sub N-screen device which is connected to the main N-screen device, the main N-screen device determines whether the screen_type indicates "Sub" at operation 225.

If the screen_type indicates "Sub", the main N-screen device discards the AIT since the main N-screen device may not run the broadcast service application at operation 227. This is why the main N-screen device may not run the broadcast service application.

If the screen_type does not indicate "Sub", the main N-screen device determines whether the screen_type indicates "Sub_Alternative" at operation 229. If the screen_type does not indicate "Sub_Alternative", the main N-screen device terminates the process for providing the N-screen service.

If the screen_type indicates "Sub_Alternative", the main N-screen device runs the broadcast service application at operation 231.

If there is the sub N-screen device, the main N-screen device determines whether the sub N-screen device is a hybrid terminal at operation 233. If the sub N-screen device is the hybrid terminal, the main N-screen device transmits the received AIT to the sub N-screen device thereby the sub N-screen device may run the broadcast service application at operation 235. That is, if the sub N-screen device is the hybrid terminal, the sub N-screen device may download the broadcast service application through at least one of a broadcast channel and a broadband channel even though the main N-screen device does not transmit the broadcast service application to the sub N-screen device after downloading the broadcast service application.

If the sub N-screen device is not the hybrid terminal, the main N-screen device downloads broadcast service application data corresponding to the received AIT through at least one of the broadcast channel and the broadband channel at operation 237. The main N-screen device transmits the downloaded broadcast service application data to the sub N-screen device thereby the sub N-screen device may run the broadcast service application at operation 239.

At operation 223, if there is the sub N-screen device, the main N-screen device does not determine whether a screen _type of a related broadcast service application indicates "Sub" or "Sub_Alternative". This is why all broadcast service applications related to the screen_types expect for "Main" are run in the sub N-screen device.

In FIGS. 2A to 2B, the main N-screen device receives the AIT from the broadcast service provider after transmitting the broadcast service provision request message. However, it will be understood by those of ordinary skill in the art that the broadcast service provider may automatically transmit the AIT to the main N-screen device.

Figure 3:
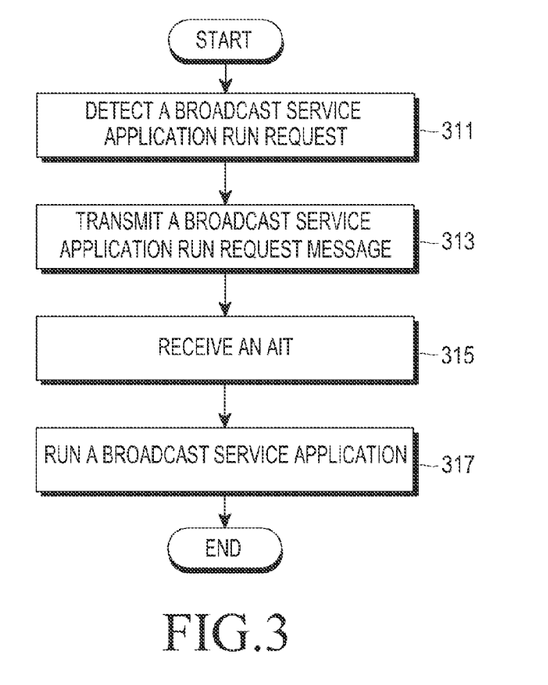
FIG. 3 schematically illustrates a processor for providing an N-screen service in a sub N-screen device as a hybrid terminal in an HbbTV system according to an embodiment of the present disclosure.

FIG. 3 schematically illustrates a processor for providing an N-screen service in a sub N-screen device as a hybrid terminal in an HbbTV system according to an embodiment of the present disclosure.

Referring to FIG. 3, the sub N-screen device detects a broadcast service application run request at operation 311. The sub N-screen device transmits a broadcast service application run request message to a main N-screen device at operation 313. The sub N-screen device receives an AIT from the main N-screen device in response to the broadcast service application run request message at operation 315. The sub N-screen device runs a broadcast service application by downloading broadcast service application data from a broadcast service provider through at least one of a broadcast channel and a broadband channel at operation 317.

Figure 4:
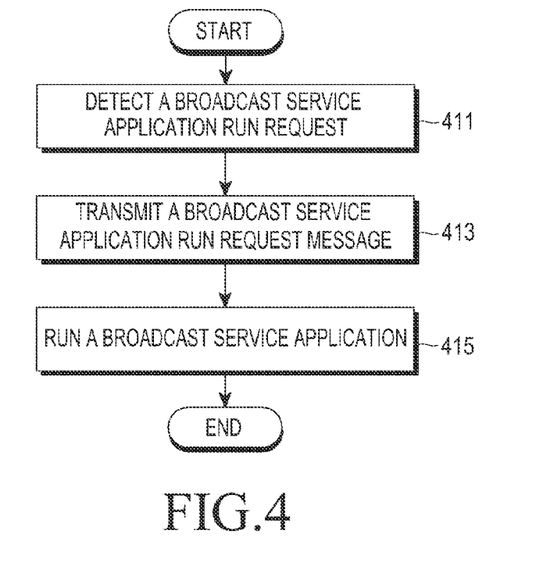
FIG. 4 schematically illustrates a processor for providing an N-screen service in a sub N-screen device which is not a hybrid terminal in an HbbTV system according to an embodiment of the present disclosure.

FIG. 4 schematically illustrates a processor for providing an N-screen service in a sub N-screen device which is not a hybrid terminal in an HbbTV system according to an embodiment of the present disclosure.

Referring to FIG. 4, the sub N-screen device detects a broadcast service application run request at operation 411. The sub N-screen device transmits a broadcast service application run request message to a main N-screen device at operation 413. The sub N-screen device runs a broadcast service application by downloading broadcast service application data from the main N-screen device at operation 415.

Meanwhile, a case where at least two broadcast service applications are run with a relationship may occur. For example, a case where a shopping application is run on a main N-screen device and a payment association application is run on a sub N-screen device may occur. In this case, it is preferred that the shopping application and the payment association application are run at the same time. However, broadcast service applications may be continuously run according to a situation even though any of the broadcast service applications is not run. That is, a case where the payment association application is continuously run on the sub N-screen device even though the shopping application is not run on the main N-screen device may occur.

As described above, a case where it is preferred that there is a relationship between a broadcast service application which is run on a main N-screen device and a broadcast service application which is run on at least one sub N-screen device may occur, so "application bound" as an attribute for the relationship may be expressed in Table 3.

TABLE 3

| application bound | a broadcast service application ID of a broadcast service application which is run by interacting with each other |
|---|---|

In Table 3, "application bound" is a parameter included in an AIT of a broadcast service application which is run on a main N-screen device, and will be described with reference to FIG. 5.

Figure 5:
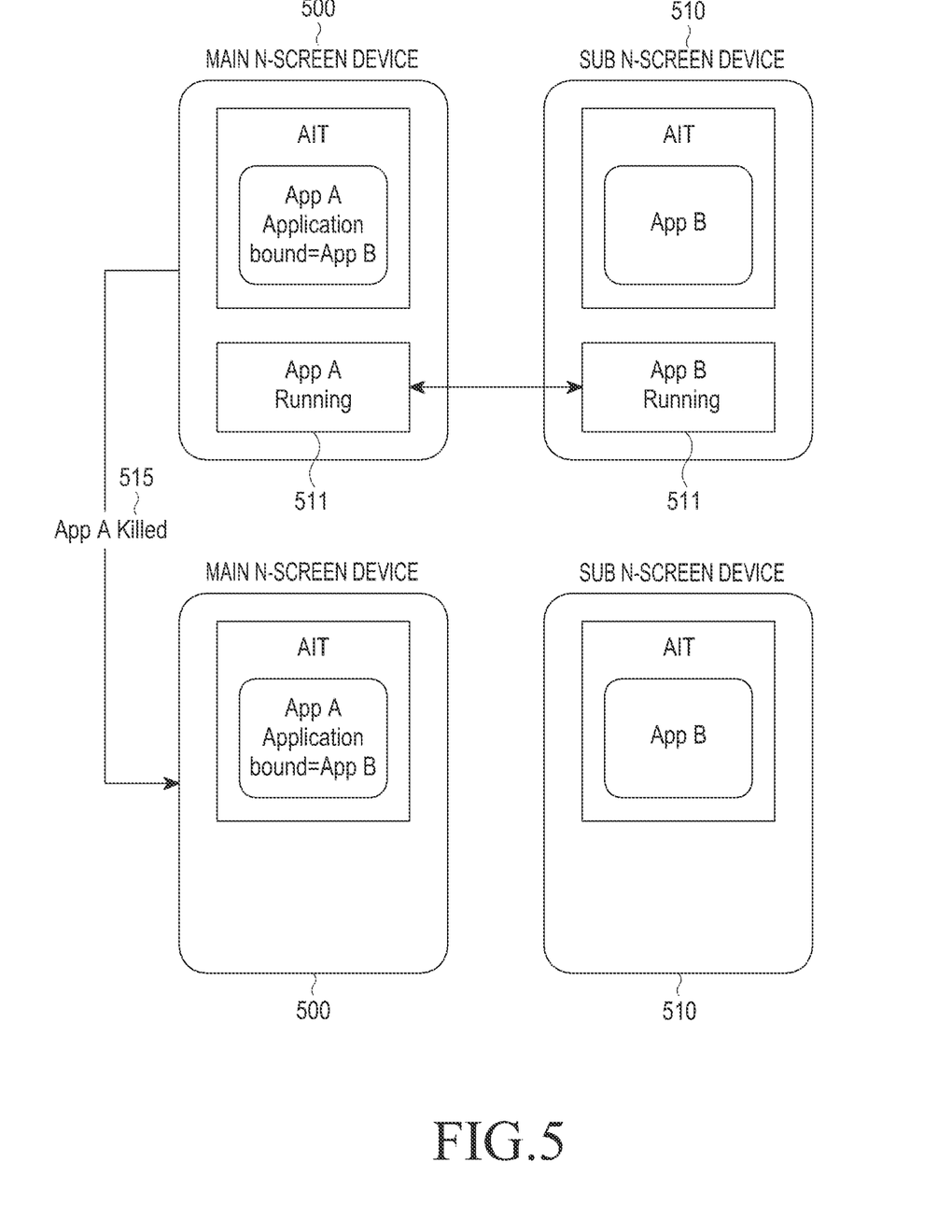
FIG. 5 schematically illustrates a relationship among broadcast service applications in an HbbTV system according to an embodiment of the present disclosure.

FIG. 5 schematically illustrates a relationship among broadcast service applications in an HbbTV system according to an embodiment of the present disclosure.

Referring to FIG. 5, a broadcast service Application A (App A) indicates a broadcast service application which is run on a main N-screen device 500, and a broadcast service Application B (App B) indicates a broadcast service application which is run on a sub N-screen device 510.

If a broadcast service application ID of 'application bound' included in an AIT of the broadcast service application indicates a broadcast service application ID of the broadcast service application B, the broadcast service application A and the broadcast service application B are run with a relationship at operation 511.

As described in FIG. 5, if the broadcast service application A is not run, that is, the broadcast service application A is "killed", the broadcast service application B is automatically "killed" at operation 515.

If running of the broadcast service application B is stopped according to user's request, or is killed according to a situation, the sub N-screen device 510 notifies the main N-screen device 500 that the broadcast service application B is "killed".

An example of an AIT including "application bound" is expressed in Table 4.

TABLE 4

```
application_descriptor( ) {
    descriptor_tag 8 uimsbf   0x00
    descriptor_length 8 uimsbf
    application_profiles_length 8 uimsbf
    for( i=0; i<N; i++ ) {
        application_profile 16 uimsbf
        version.major 8 uimsbf
        version.minor 8 uimsbf
        version.micro 8 uimsbf
    }
    service_bound_flag 1 bslbf
    Application_bound 8
    visibility 2 bslbf
    reserved_future_use 5 bslbf
    application_priority 8 uimsbf
    for( i=0; i<N; i++ ) {
        transport_protocol_label 8 uimsbf
    }
}
```

In FIG. 5, a broadcast service application A is run on a main N-screen device, and a broadcast service application B is run on a sub N-screen device. However, it will be understood by those of ordinary skill in the art that a type of an N-screen device on which each of the broadcast service application A and the broadcast service application B is run is not limited. That is, each of the broadcast service application A and the broadcast service application B has only to be run in an individual N-screen device.

Figure 6:
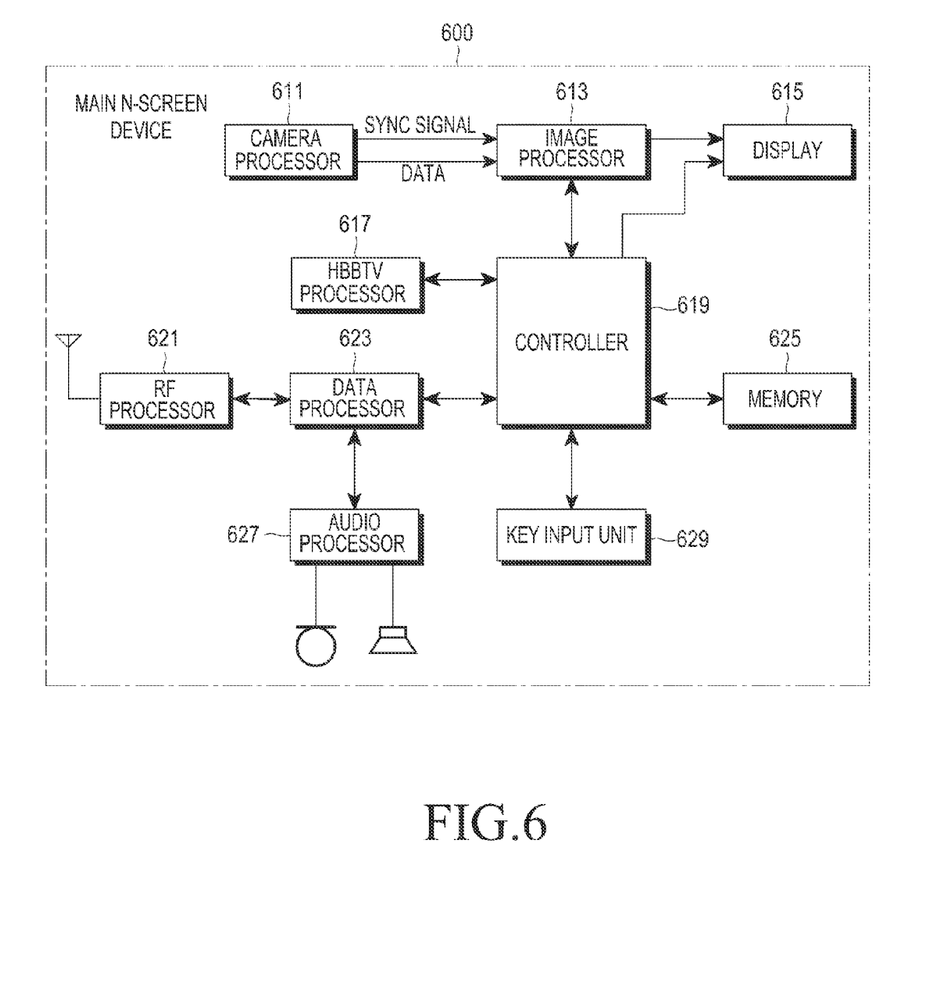
FIG. 6 schematically illustrates an internal structure of a main N-screen device in an HbbTV system according to an embodiment of the present disclosure.

FIG. 6 schematically illustrates an internal structure of a main N-screen device in an HbbTV system according to an embodiment of the present disclosure.

Referring to FIG. 6, a main N-screen device 600 may be connected with an external electronic device (not illustrated in FIG. 6) using at least one of a communication module, a connector, and an earphone connecting jack. The electronic device may include one of various devices which are removable from the main N-screen device 600 and are connectible with the main N-screen device 600 in a wired manner, such as, for example, an earphone, an external speaker, a Universal Serial Bus (USB) memory, a charging device, a cradle/dock, a Digital Multimedia Broadcasting (DMB) antenna, a mobile payment-related device, a health management device (a blood pressure monitor or the like), a game console, a vehicle navigation device, and so forth.

The external electronic device may be one of a wirelessly connectible Bluetooth communication device, a Near Field Communication (NFC) device, a WiFi Direct communication device, a wireless Access Point (AP), etc. The main N-screen device 600 may be connected with another N-screen device or electronic device such as, for example, one of a cellular phone, a smart phone, a tablet Personal Computer (PC), a desktop PC, and a server, in a wired or wireless manner.

The main N-screen device 600 includes a camera processor 611, an image processor 613, a display 615, an HbbTV processor 617, a controller 619, a Radio Frequency (RF) processor 621, a data processor 623, a memory 625, an audio processor 627, and a key input unit 629. The main N-screen device 600 may be an HbbTV, so the main N-screen device 600 includes the HbbTV processor 617, and the HbbTV processor 617 may be a broadcast processor which may process a general broadcast signal.

The RF processor 621 is responsible for radio communication of the main N-screen device 600. The RF processor 621 includes a RF transmitter for frequency up-converting transmission signals and amplifying the up-converted signals, and a RF receiver for low-noise-amplifying received signals and frequency down-converting the amplified signals.

The data processor 623 includes a transmitter for encoding and modulating the transmission signals, and a receiver for demodulating and decoding the received signals. In other words, the data processor 623 may include a modulator/demodulator (MODEM) and a coder/decoder (CODEC). The CODEC includes a data CODEC for processing packet data, and an audio CODEC for processing audio signals such as voice.

The audio processor 627 plays received audio signals output from the audio CODEC in the data processor 623 using a speaker, and transfers transmission audio signals picked up by a microphone to the audio CODEC in the data processor 623.

The key input unit 629 includes numeric/character keys for inputting numeric and character information and function keys for setting various functions.

A memory 625 may include a program memory and a data memory. The program memory may store programs for controlling the general operation of the main N-screen device 600. In accordance with an embodiment to the present disclosure, the memory 625 may store a control program for providing an N-screen service. The data memory may temporarily store the data generated during execution of these programs.

The memory 625 may be implemented as an arbitrary data storing device such as a Read Only Memory (ROM), a Random Access Memory (RAM), and a memory card (for example, a Secure Digital (SD) card, and a memory stick). The memory 625 may include a non-volatile memory, a volatile memory, a Hard Disk Drive (HDD), or a Solid State Drive (SSD).

The memory 625 may also store applications of various functions such as navigation, video communication, games, an alarm application based on time, images for providing a Graphic User Interface (GUI) related to the applications, user information, documents, databases or data related to a method for processing touch inputs, background images (for example, a menu screen, a standby screen, and so forth), operation programs necessary for driving the main N-screen device 600, and images captured by the camera processor 611.

The memory 625 is a media which is read though a machine, e.g., a computer. Here, the term "machine-readable medium" includes a medium for providing data to the machine to allow the machine to execute a particular function. The memory 625 may include non-volatile media and volatile media. Such a medium is of a tangible type so that commands delivered to the medium can be detected by a physical tool which reads the commands with the machine.

The machine-readable medium may include, but is not limited to, at least one of a floppy disk, a flexible disk, a hard disk, a magnetic tape, a Compact Disc Read-Only Memory (CD-ROM), an optical disk, a punch card, a paper tape, a RAM, a Programmable Read-Only Memory (PROM), an Erasable PROM (EPROM), and a flash-EPROM.

The controller 619 controls the overall operation of the main N-screen device 600. The controller 619 performs a broadcast service application corresponding to a screen_type included in an AIT of the broadcast service application, or performs an operation related to running the broadcast service application with a sub N-screen device according to an embodiment of the present disclosure. The operation related to running the broadcast service application and running the broadcast service application with the sub N-screen device is performed in the manner described before with reference to FIGS. 2A to 5, so a detailed description thereof will be omitted herein.

A camera processor 611 includes a camera sensor for capturing images and converting the captured optical image signal into an electrical signal, and a signal processor for converting the analog image signal captured by the camera sensor into digital data. The camera sensor may be a Charge-Coupled Device (CCD) or Complementary Metal-Oxide-Semiconductor (CMOS) sensor, and the signal processor may be implemented with a Digital Signal Processor (DSP). The camera sensor and the signal processor may be implemented either in an integrated way, or in a separated way.

The image processor 613 performs Image Signal Processing (ISP) for displaying the image signals output from the camera processor 611 on the display 615. The ISP may include gamma correction, interpolation, spatial variations, image effects, image scaling, Automatic White Balance (AWB), Automatic Exposure (AE), and Automatic Focus (AF). The image processor 613 processes the image signals output from the camera processor 611 on a frame-by-frame basis, and outputs the frame image data according to the characteristics and size of the display 615.

The image processor 613 includes a video codec, which compresses the frame image data displayed on the display 615 by a preset coding scheme, and decompresses the compressed frame image data into the original frame image data. The video codec may include a Joint Photographic Experts Group (JPEG) codec, a Moving Picture Experts Group 4 (MPEG4) codec, and a Wavelet codec. The image processor 613 is assumed to have an On-Screen Display (OSD) function, and may output OSD data according to the size of the displayed screen, under control of the controller 619.

The display 615 displays, on its screen, image signals output from the image processor 613 and user data output from the controller 619. The display 615 may include a Liquid Crystal Display (LCD). In this case, the display 615 may include an LCD controller, a memory capable of storing image data, and an LCD panel. When implemented in a touch screen manner, the LCD may serve as an input unit. In this case, the same keys as those on the key input unit 629 may be displayed on the display 615.

If the display 615 is implemented as the touch screen, the display 615 outputs an analog signal, which corresponds to at least one input to a user graphic interface, to the controller 619.

The display 615 receives at least one user input through a user's body (for example, a finger including a thumb) or the key input unit 629 (for example, a stylus pen or an electronic pen).

The display 615 receives continuous motion on one touch (for example, a drag). The display 615 outputs an analog signal corresponding to the continuous motion to the controller 619.

In an embodiment of the present disclosure, a touch may also include a non-contact touch (for example, when the user input means is positioned within a distance of, for example, 1 cm) in which the user input means may be detected without a direct contact with the display 615. The touch may also include a direct contact between the display 615 and a finger or the key input unit 629. A distance or interval from the display 615 within which the user input means may be detected may be changed according to the capability or structure of the main N-screen device 600. In particular, to separately detect a direct touch event based on a contact with the user input means and an indirect touch event (that is, a hovering event), the display 615 may be configured to output different values for values (for example, an analog voltage value or current value) detected in the direct touch event and the hovering event.

The display 615 may be implemented as, for example, a resistive type, a capacitive type, an infrared type, an acoustic wave type, or a combination thereof.

The display 615 may include at least two touch panels capable of sensing a touch, an approach of a finger, or the key input unit 629 to receive inputs generated by the finger or the key input unit 629. The at least two touch panels provide different output values to the controller 619. Thus, the controller 619 differently recognizes the values input from the at least two touch screen panels to identify whether the input from the display 615 is the input generated by the finger or by the key input unit 629.

The controller 619 converts the analog signal received from the display 615 into a digital signal and controls the display 615 using the digital signal. For example, the controller 619 may control a shortcut icon (not illustrated in FIG. 6) displayed on the display 615 to be selected or executed in response to a direct touch event or a hovering event.

The controller 619, by detecting a value (for example, an electric-current value) output through the display 615, recognizes a hovering interval or distance as well as a user input position and converts the recognized distance into a digital signal (for example, a Z coordinate). The controller 619 may also, by detecting the value output through the display 615, detect a pressure applied by the user input means to the display 615, and convert the detected pressure into a digital signal.

The display 615 displays the broadcast service application according to an embodiment of the present disclosure. The HbbTV processor 617 receives an AIT from a broadcast service provider of an HbbTV system, and receives broadcast service application data through at least one of a broadcast channel and a broadband channel.

While the camera processor 611, the image processor 613, the display 615, the HbbTV processor 617, the controller 619, the RF processor 621, the data processor 623, the memory 625, the audio processor 627, and the key input unit 629 are shown in FIG. 6 as separate units, it is to be understood that this is for merely convenience of description. In other words, two or more of the camera processor 611, the image processor 613, the display 615, the HbbTV processor 617, the controller 619, the RF processor 621, the data processor 623, the memory 625, the audio processor 627, and the key input unit 629 may be incorporated into a single unit.

Figure 7:
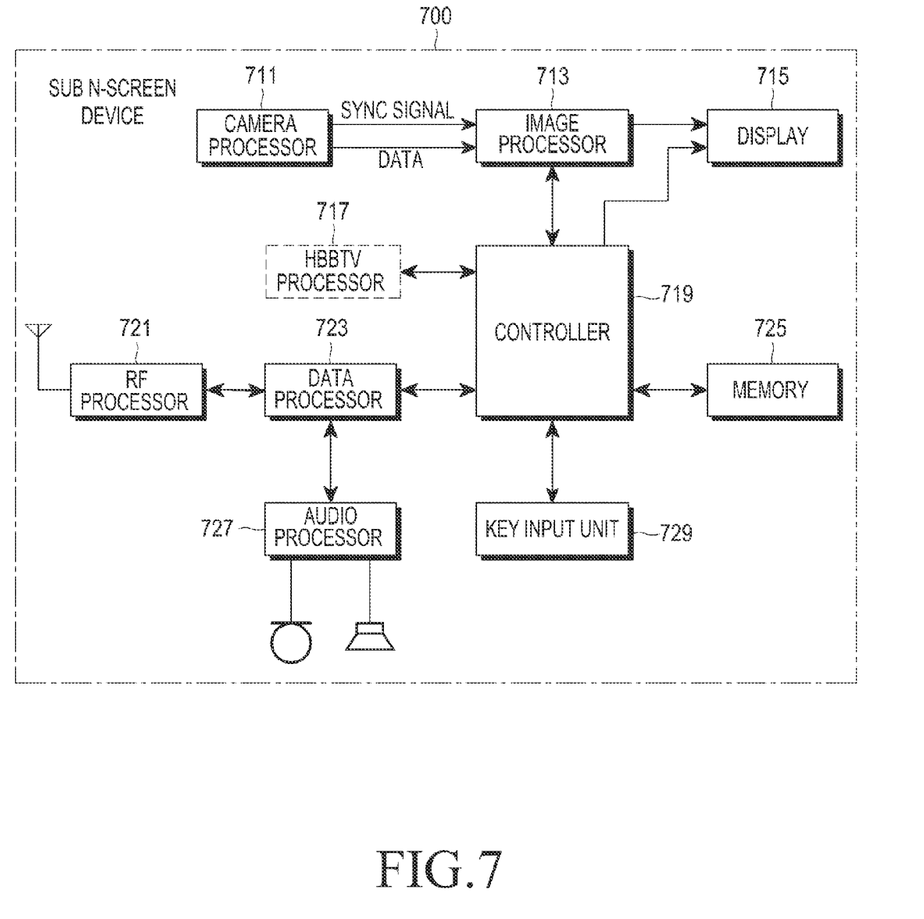
FIG. 7 schematically illustrates an internal structure of a sub N-screen device in an HbbTV system according to an embodiment of the present disclosure.

FIG. 7 schematically illustrates an internal structure of a sub N-screen device in an HbbTV system according to an embodiment of the present disclosure.

Referring to FIG. 7, a sub N-screen device 700 may be connected with an external electronic device (not illustrated in FIG. 7) using at least one of a communication module, a connector, and an earphone connecting jack. The electronic device may include one of various devices which are removable from the sub N-screen device 700 and are connectible with the sub N-screen device 700 in a wired manner, such as, for example, an earphone, an external speaker, a USB memory, a charging device, a cradle/dock, a DMB antenna, a mobile payment-related device, a health management device (a blood pressure monitor or the like), a game console, a vehicle navigation device, and so forth.

The external electronic device may be one of a wirelessly connectible Bluetooth communication device, a NFC device, a WiFi Direct communication device, a wireless AP, etc. The sub N-screen device 700 may be connected with another N-screen device or electronic device such as, for example, one of a cellular phone, a smart phone, a tablet PC, a desktop PC, and a server, in a wired or wireless manner.

The sub N-screen device 700 includes a camera processor 711, an image processor 713, a display 715, an HbbTV processor 717, a controller 719, a RF processor 721, a data processor 723, a memory 725, an audio processor 727, and a key input unit 729. For example, the sub N-screen device 700 may be a hybrid terminal. If the sub N-screen device 700 is a general terminal not the hybrid terminal, the sub N-screen device 700 does not include the HbbTV processor 717. If the sub N-screen device 700 is not the hybrid terminal, the HbbTV processor 717 may be a broadcast processor which may process a general broadcast signal.

The RF processor 721 is responsible for radio communication of the sub N-screen device 700. The RF processor 721 includes a RF transmitter for frequency up-converting transmission signals and amplifying the up-converted signals, and a RF receiver for low-noise-amplifying received signals and frequency down-converting the amplified signals. The data processor 723 includes a transmitter for encoding and modulating the transmission signals, and a receiver for demodulating and decoding the received signals. In other words, the data processor 723 may include a MODEM and a CODEC. The CODEC includes a data CODEC for processing packet data, and an audio CODEC for processing audio signals such as voice. The audio processor 727 plays received audio signals output from the audio CODEC in the data processor 723 using a speaker, and transfers transmission audio signals picked up by a microphone to the audio CODEC in the data processor 723.

The key input unit 729 includes numeric/character keys for inputting numeric and character information and function keys for setting various functions. A memory 725 may include a program memory and a data memory. The program memory may store programs for controlling the general operation of the sub N-screen device 700. In accordance with an embodiment to the present disclosure, the memory 725 may store a control program for providing an N-screen service. The data memory may temporarily store the data generated during execution of these programs.

The memory 725 may be implemented as an arbitrary data storing device such as a ROM, a RAM, and a memory card (for example, a SD card, and a memory stick). The memory 725 may include a non-volatile memory, a volatile memory, an HDD, or an SSD.

The memory 725 may also store applications of various functions such as navigation, video communication, games, an alarm application based on time, images for providing a GUI related to the applications, user information, documents, databases or data related to a method for processing touch inputs, background images (for example, a menu screen, a standby screen, and so forth), operation programs necessary for driving the sub N-screen device 700, and images captured by the camera processor 711.

The memory 725 is a media which is read though a machine, e.g., a computer. Here, the term "machine-readable medium" includes a medium for providing data to the machine to allow the machine to execute a particular function. The memory 725 may include non-volatile media and volatile media. Such a medium is of a tangible type so that commands delivered to the medium can be detected by a physical tool which reads the commands with the machine.

The machine-readable medium may include, but is not limited to, at least one of a floppy disk, a flexible disk, a hard disk, a magnetic tape, a CD-ROM, an optical disk, a punch card, a paper tape, a RAM, a PROM, an EPROM, and a flash-EPROM.

The controller 719 controls the overall operation of the sub N-screen device 700. The controller 719 performs a broadcast service application corresponding to a screen_type included in an AIT of the broadcast service application, or performs an operation related to running the broadcast service application with a main N-screen device according to an embodiment of the present disclosure. The operation related to running the broadcast service application and running the broadcast service application with the main N-screen device is performed in the manner described before with reference to FIGS. 2A to 5, so a detailed description thereof will be omitted herein.

A camera processor 711 includes a camera sensor for capturing images and converting the captured optical image signal into an electrical signal, and a signal processor for converting the analog image signal captured by the camera sensor into digital data. The camera sensor may be a CCD or CMOS sensor, and the signal processor may be implemented with a DSP. The camera sensor and the signal processor may be implemented either in an integrated way, or in a separated way.

The image processor 713 performs ISP for displaying the image signals output from the camera processor 711 on the display 715. The ISP may include gamma correction, interpolation, spatial variations, image effects, image scaling, AWB, AE, and AF. The image processor 713 processes the image signals output from the camera processor 711 on a frame-by-frame basis, and outputs the frame image data according to the characteristics and size of the display 715. The image processor 713 includes a video codec, which compresses the frame image data displayed on the display 715 by a preset coding scheme, and decompresses the compressed frame image data into the original frame image data. The video codec may include a JPEG codec, an (MPEG4 codec, and a Wavelet codec. The image processor 713 is assumed to have an OSD function, and may output OSD data according to the size of the displayed screen, under control of the controller 719.

The display 715 displays, on its screen, image signals output from the image processor 713 and user data output from the controller 719. The display 715 may include an LCD. In this case, the display 715 may include an LCD controller, a memory capable of storing image data, and an LCD panel. When implemented in a touch screen manner, the LCD may serve as an input unit. In this case, the same keys as those on the key input unit 729 may be displayed on the display 715.

If the display 715 is implemented as the touch screen, the display 715 outputs an analog signal, which corresponds to at least one input to a user graphic interface, to the controller 719.

The display 715 receives at least one user input through a user's body (for example, a finger including a thumb) or the key input unit 729 (for example, a stylus pen or an electronic pen).

The display 715 receives continuous motion on one touch (for example, a drag). The display 715 outputs an analog signal corresponding to the continuous motion to the controller 719.

In an embodiment of the present disclosure, a touch may also include a non-contact touch (for example, when the user input means is positioned within a distance of, for example, 1 cm) in which the user input means may be detected without a direct contact with the display 715. The touch may also include a direct contact between the display 715 and a finger or the key input unit 729. A distance or interval from the display 715 within which the user input means may be detected may be changed according to the capability or structure of the sub N-screen device 700. In particular, to separately detect a direct touch event based on a contact with the user input means and an indirect touch event (that is, a hovering event), the display 715 may be configured to output different values for values (for example, an analog voltage value or current value) detected in the direct touch event and the hovering event.

The display 715 may be implemented as, for example, a resistive type, a capacitive type, an infrared type, an acoustic wave type, or a combination thereof.

The display 715 may include at least two touch panels capable of sensing a touch, an approach of a finger, or the key input unit 729 to receive inputs generated by the finger or the key input unit 729. The at least two touch panels provide different output values to the controller 719. Thus, the controller 719 differently recognizes the values input from the at least two touch screen panels to identify whether the input from the display 715 is the input generated by the finger or by the key input unit 729.

The controller 719 converts the analog signal received from the display 715 into a digital signal and controls the display 715 using the digital signal. For example, the controller 719 may control a shortcut icon (not illustrated in FIG. 7) displayed on the display 715 to be selected or executed in response to a direct touch event or a hovering event.

The controller 719, by detecting a value (for example, an electric-current value) output through the display 715, recognizes a hovering interval or distance as well as a user input position and converts the recognized distance into a digital signal (for example, a Z coordinate). The controller 719 may also, by detecting the value output through the display 715, detect a pressure applied by the user input means to the display 715, and convert the detected pressure into a digital signal.

The display 715 displays the broadcast service application according to an embodiment of the present disclosure. The HbbTV processor 717 receives an AIT from a main N-screen device, and receives broadcast service application data from a broadcast service provider through at least one of a broadcast channel and a broadband channel.

While the camera processor 711, the image processor 713, the display 715, the HbbTV processor 717, the controller 719, the RF processor 721, the data processor 723, the memory 725, the audio processor 727, and the key input unit 729 are shown in FIG. 7 as separate units, it is to be understood that this is for merely convenience of description. In other words, two or more of the camera processor 711, the image processor 713, the display 715, the HbbTV processor 717, the controller 719, the RF processor 721, the data processor 723, the memory 725, the audio processor 727, and the key input unit 729 may be incorporated into a single unit.

As is apparent from the foregoing description, the present disclosure enables to provide an N-screen service in a broadcast system.

The present disclosure enables to provide an N-screen service by considering priorities of broadcast service applications which are run on a plurality of screens in a broadcast system.

The present disclosure enables to provide an N-screen service by considering relationships of broadcast service applications which are run on a plurality of screens in a broadcast system.

The present disclosure enables to provide an N-screen service by considering positions of a plurality of screens in a broadcast system.

The present disclosure enables to provide various User eXperiences (UXs) to a user by providing various broadcast service applications using an N-screen service.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for supplying an N-screen service by a sub N-screen device in a broadcast system, the method comprising:

receiving, by the sub N-screen device, from the main N-screen device, a screen_type indicating that that: a broadcast service application is to be run on the sub N-screen device, if there are one or more sub N-screen devices in the broadcast system, and the broadcast service application is to be run on the main N-screen device, if there is no sub N-screen device in the broadcast system; and running, by the sub N-screen device, the broadcast service application based on the screen type, wherein the sub N-screen device is a hybrid terminal which is able to receive a broadcast channel signal and a broadband channel signal directly from a broadcast service provider, wherein the running of the broadcast service application based on the screen type comprises: receiving, from the main N-screen device, an application information table (AIT); receiving, directly from the broadcast service provider, broadcast service application data corresponding to the broadcast service application based on the AIT; and running the broadcast service application based on the broadcast service application data, and wherein the running of the broadcast service application of the sub N-screen device is automatically killed, if the running of a broadcast service application of the main N-screen device is killed, the broadcast service application of the main N-screen related with the broadcast service application of the sub N-screen device.

2. The method of claim 1, wherein, the running, by the sub N-screen device, of the broadcast service application based on the screen type comprises: receiving, from the main N-screen device, by the sub N-screen device, the broadcast service application data corresponding to the broadcast service application; and running, by the sub N-screen device, the broadcast service application based on the broadcast service application data.

3. The method of claim 2, wherein the sub N-screen device is a terminal to receive the broadband channel signal from an internet network.

4. A sub N-screen device in a broadcast system, the sub N-screen device comprising: a broadcast processor configured to receive, from the main N-screen device, a screen_type indicating that: a broadcast service application is to be run on the sub N-screen device, if there are one or more sub N-screen devices in the broadcast system, and the broadcast service application is to be run on the main N-screen device, if there is no sub N-screen device in the broadcast system; and a controller configured to run the broadcast service application based on the screen type, and wherein, the sub N-screen device is a hybrid terminal which is able to receive a broadcast channel signal and a broadband channel signal directly from a broadcast service provider, wherein the broadcast processor is further configured to: receive, from the main N-screen device, an application information table (AIT), and receive broadcast service application data corresponding to the broadcast service application directly from the broadcast service provider based on the AIT, wherein the controller runs the broadcast service application based on the broadcast service application data, and wherein the controller is configured to kill running of the broadcast service application of the sub N-screen device automatically if the running of the broadcast service application of the main N-screen device is killed, the broadcast service application of the main N-screen related with the broadcast service application of the sub N-screen device.

5. The sub N-screen device of claim 4, wherein, the broadcast processor is further configured to receive, from the main N-screen device, broadcast service application data corresponding to the broadcast service application, and wherein the controller is further configured to run the broadcast service application based on the broadcast service application data.

6. The sub N-screen device of claim 5, wherein the sub N-screen device is a terminal to receive the broadband channel signal from an internet network.

* * * * *